Feb. 28, 1967  B. H. KRYZER ETAL  3,306,450
WATER CONDITIONING SYSTEM
Filed June 5, 1963  3 Sheets-Sheet 1
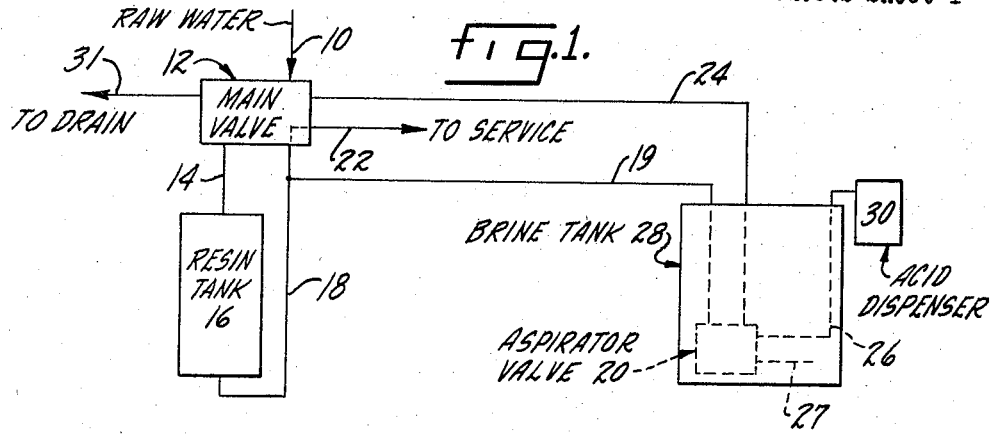
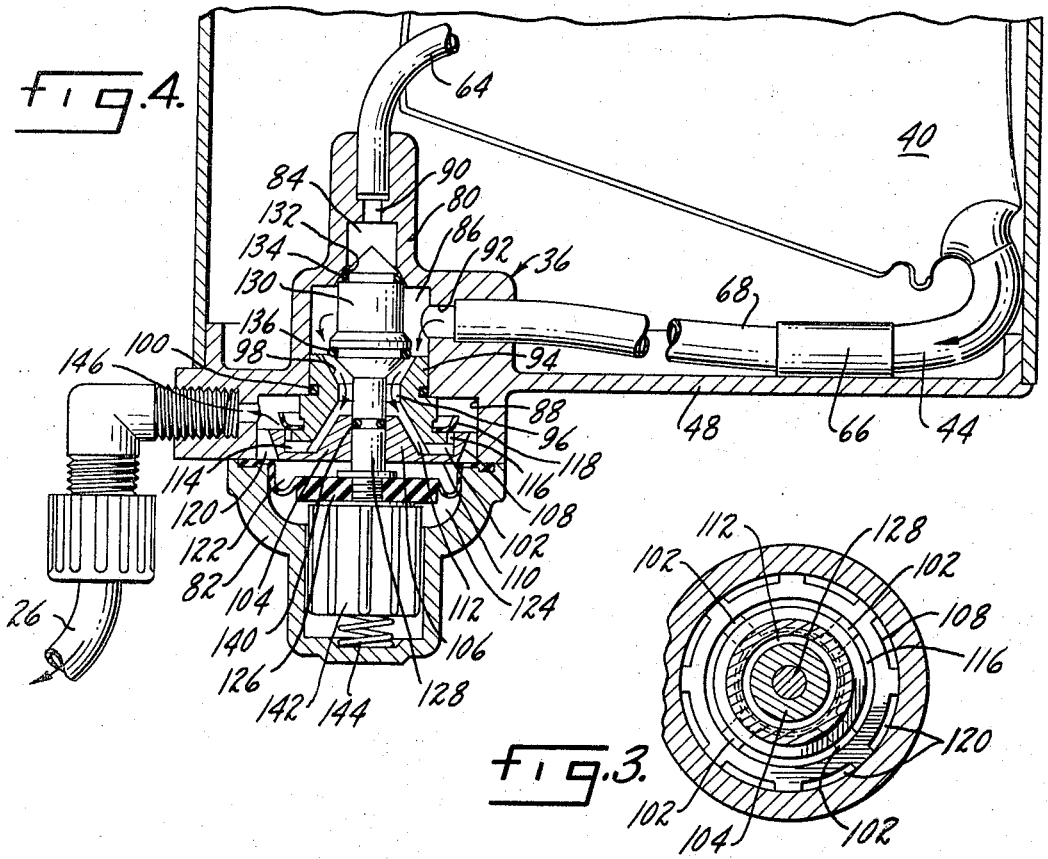
INVENTORS.
BENJAMIN H. KRYZER
THOMAS J. SCHOENECKER
BY Byron, Hume, Groen & Clement
Attorneys.

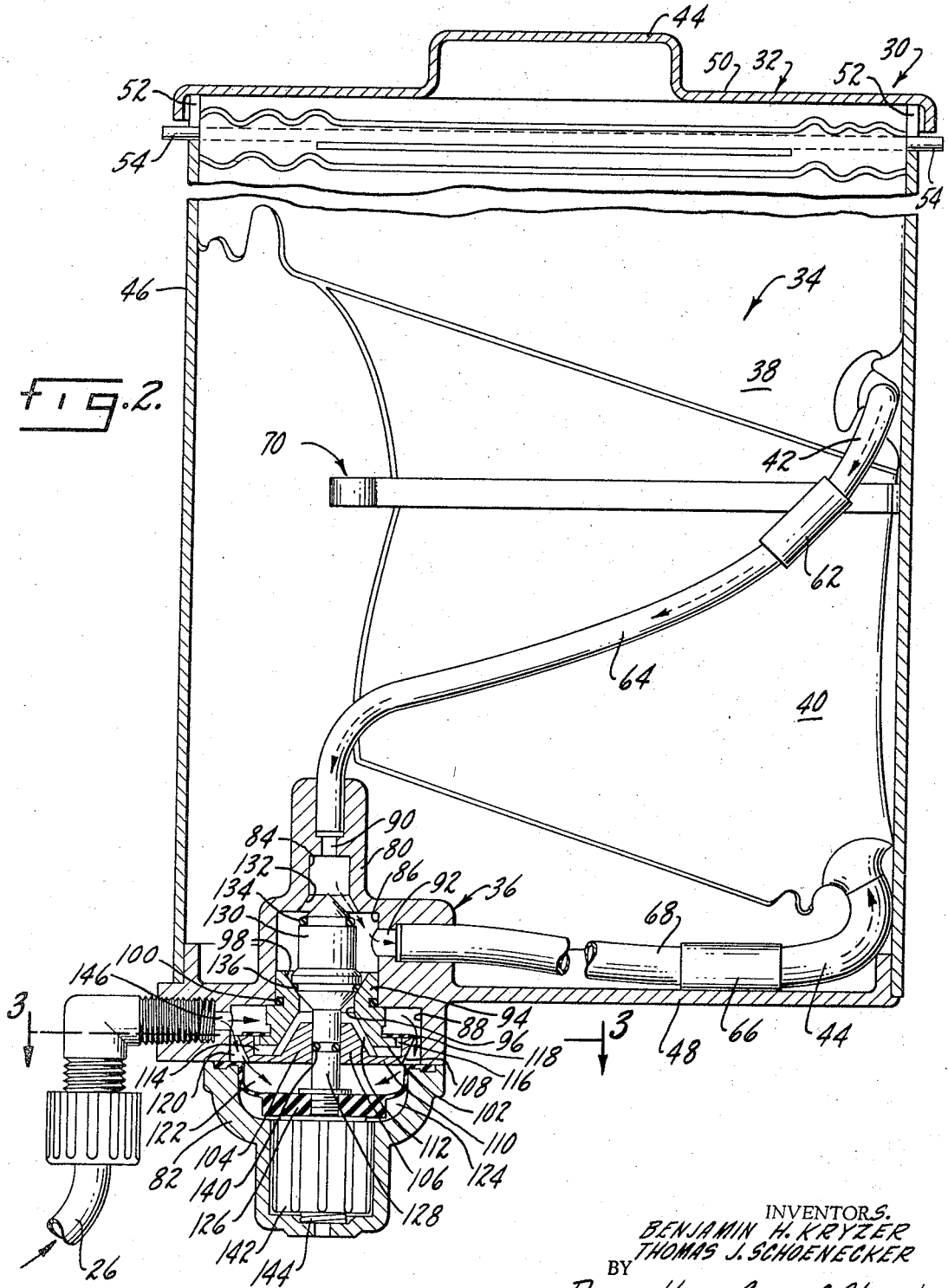

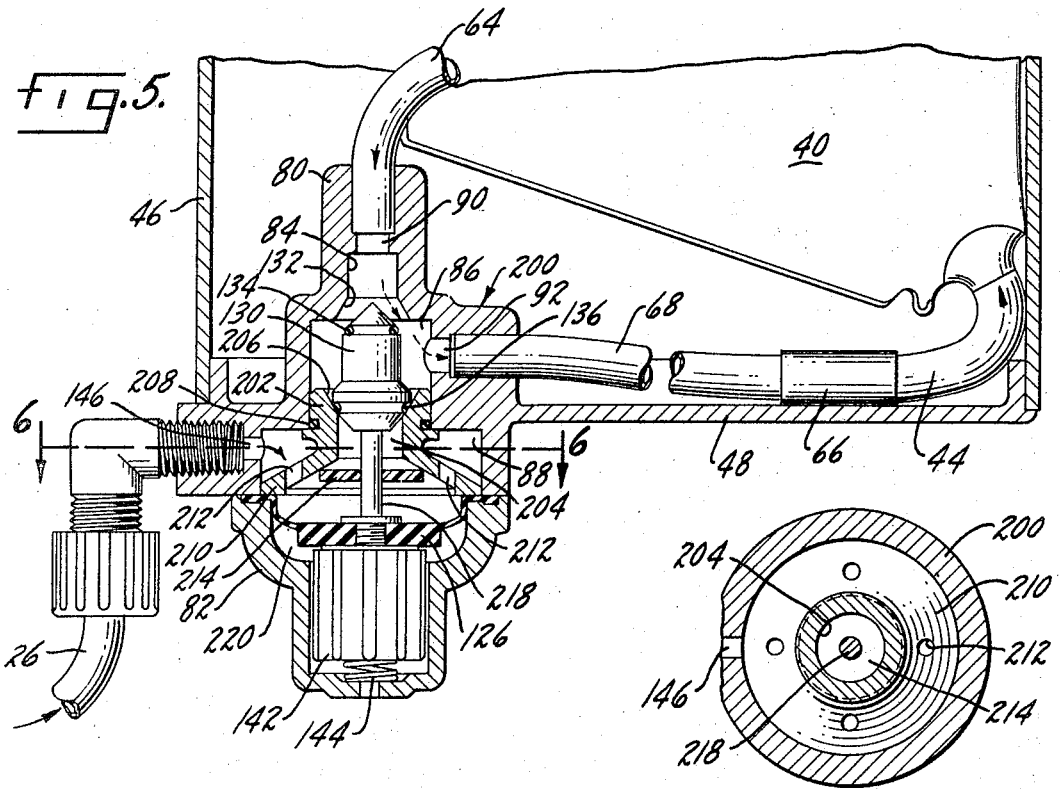
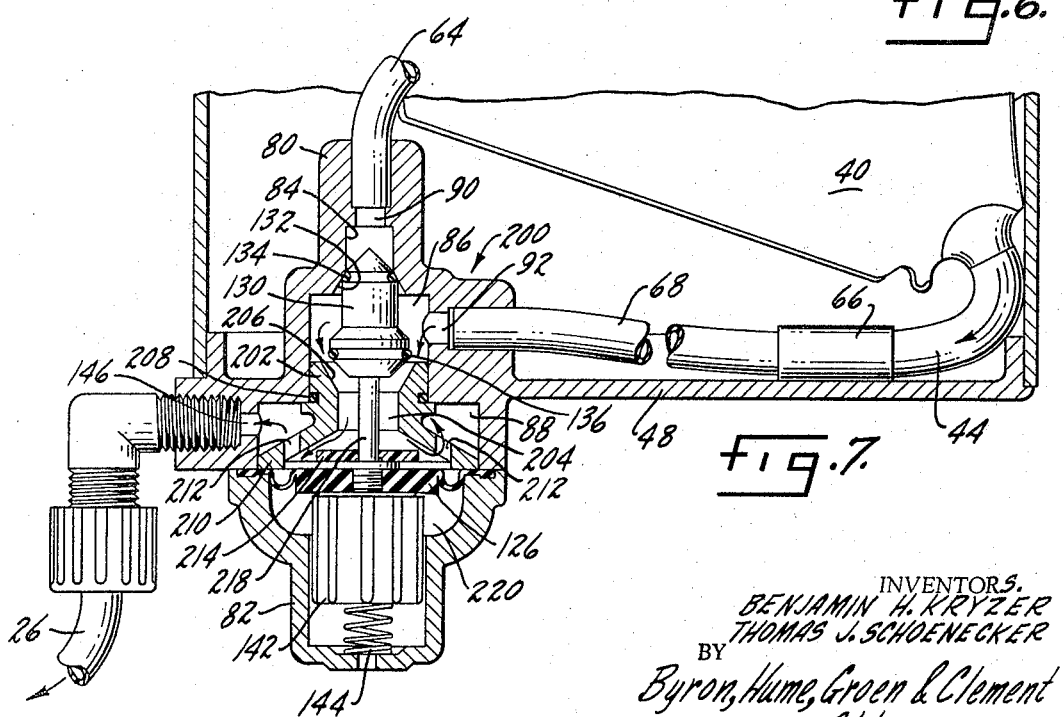

United States Patent Office 3,306,450
Patented Feb. 28, 1967

3,306,450
WATER CONDITIONING SYSTEM
Benjamin H. Kryzer, St. Paul, and Thomas J. Schoenecker, North St. Paul, Minn., assignors to Union Tank Car Company, Chicago, Ill., a corporation of New Jersey
Filed June 5, 1963, Ser. No. 285,815
10 Claims. (Cl. 210—134)

This invention relates to a valve means and, more particularly, to a valve means for an acid dispenser in a water softening system.

Water softening with ion exchange resin particles is well known in the art. After prolonged contact of the ion exchange resin particles with raw water during the service cycle, these resin particles become "exhausted," i.e., their ability to exchange soft ions for the hard ions in the raw water is substantially diminished. When the ion exchange resin particles become exhausted, they must be regenerated. Heretofore, regeneration has been effected by contacting the resin particles with a brine solution, e.g., an aqueous solution of sodium chloride. More recently, it has been found that improved regeneration of the ion exchange resin particles is achieved by contacting the resin particles with an aqueous acid solution, such as citric acid or the like, and the brine solution. A sequential process may be employed wherein the resin particles are contacted first with the acid solution and then with the brine solution. Likewise the resin particles may be simultaneously contacted with the acid solution and the brine solution. These processes are discussed in detail in copending application Serial No. 170,043, filed January 31, 1962, and assigned to the assignee of the present application. In any event, such processes require means to dispense the aqueous acid solution which is to be contacted with the resin particles during the regeneration cycle.

Generally speaking, acid dispensers have a reservoir chamber containing a supply of acid solution and a metering chamber. The acid dispenser is connected to a line which is under a high pressure during the service cycle and under a low pressure during the regeneration cycle. During the service cycle acid solution passes from the reservoir chamber to the metering chamber wherein a predetermined amount of acid solution is isolated. During the regeneration cycle the acid solution in the metering chamber is discharged to the line through which it passes to the resin particles. Valve means are required to allow acid solution to pass from the reservoir chamber to the metering chamber during the service cycle and to allow the acid solution in the metering chamber to pass to the line during the regeneration cycle.

Accordingly, it is an object of the present invention to provide a valve means which may be connected to a line, a reservoir chamber and a metering chamber whereby liquid in said reservoir chamber may be passed to said metering chamber and the liquid in said metering chamber may be passed to said line.

It is a further object of the present invention to provide a pressure-actuated valve means.

It is still another object of the present invention to provide a valve means for transferring liquid from a reservoir chamber to a metering chamber.

It is another object of the present invention to provide a valve means adapted to be connected to a first line, a second line and a third line, the first line having a low pressure cycle and a high pressure cycle, said valve means being actuated during said high pressure cycle to allow fluid to pass from said second line through said valve means to said third line and said valve means being actuated during said low pressure cycle to allow fluid to pass from said third line through said valve means to said first line.

It is a still further object of the present invention to provide for a water softening system having a line which is under a high pressure during the service cycle and under a low pressure during the regeneration cycle, a valve means for an acid dispenser having a reservoir chamber and a metering chamber, said valve means being adapted to be actuated during said high pressure cycle to allow acid solution to pass from said reservoir chamber to said metering chamber through said valve means, and said valve means being actuated during said low pressure cycle to allow acid solution in said metering chamber to pass through said valve means to said line.

These and other objects more apparent hereinafter are realized by the valve means embodying the features of the present invention which is adapted to be actuated by the pressure in a line to which it is attached. When the line is under a high pressure the valve means is actuated to allow fluid to flow from a second line through the valve means to a third line. When the line is under a low pressure, the valve means is actuated to allow fluid to pass from the third line through the valve means to the first line.

The invention, both as to its organization and method of operation, taken with further objects and advantages thereof, will be understood by reference to the following description taken in conjunction with the accompanying drawings, in which:

FIGURE 1 is a schematic diagram of a water softening system wherein water is treated with ion exchange resin particles which are regenerated by an acid solution and a brine solution, the acid solution being supplied from an acid dispenser utilizing a valve means embodying the features of the present invention;

FIGURE 2 is a cut-away view of the acid dispenser of FIGURE 1 illustrating in cross section the valve means embodying the features of the present invention when said valve means is allowing acid solution to pass from a reservoir chamber to a metering chamber in said acid dispenser;

FIGURE 3 is a cross-sectional view of the valve means embodying the features of the present invention taken along line 3—3 of FIGURE 2;

FIGURE 4 is a cross-sectional view of the valve means of FIGURE 2 when said valve means allows acid solution to pass from the metering chamber to a line to which it is attached in the water softening system of FIGURE 1;

FIGURE 5 is a cross-sectional view of a modified valve means embodying the features of the present invention, said modified valve means being shown when said valve means is allowing acid solution to pass from said reservoir chamber to a metering chamber;

FIGURE 6 is a cross-sectional view of the valve means of FIGURE 5 taken along line 6—6 of FIGURE 6; and FIGURE 7 is a cross-sectional view of the valve means of FIGURE 5 when the valve means is allowing acid solution to pass from the metering chamber to the line to which the valve means is attached in the water softening system.

Referring to the drawings, and more particularly to FIGURE 1, there is schematically illustrated a water softening system for treating water with ion exchange resin particles. Suitable ion exchange resin particles are well known in the art and do not constitute a part of the present invention. In this system the ion exchange resin particles, when they become exhausted, are regenerated with an acid solution and a brine solution.

During the service cycle, raw water from a suitable source is passed through a feed line 10 to a main valve indicated generally by reference numeral 12. The main valve 12 directs the raw water through a line 14 to a resin tank 16 which contains a bed of the ion exchange resin particles as is well known in the art. The raw water passes through the bed of ion exchange resin particles and is withdrawn from the tank 16 through a line 18. The treated water, which has been softened by contact with the ion exchange resin particles, passes through the line 18 to the main valve 12 which diverts it to a service line 22. There is, of course, no mixing of the treated water with the raw water in the main valve 12.

After a predetermined quantity of raw water has passed through the resin tank 16, the ion exchange resin particles lose their capacity to effectively soften the raw water and must be regenerated. This is effected by simultaneously contacting the exhausted resin particles with an acid solution and a brine solution. The regeneration cycle is initiated by actuating the main valve 12 so that a portion of the raw water from the line 10 is directed to the service line 22. In this manner, a supply of water is maintained to the service line 22 during the regeneration cycle. The remainder of the raw water is directed by the main valve 12 through a line 24 into an aspirator valve 20. As the raw water passes through the aspirator valve 20 in this direction a partial vacuum, i.e., a pressure less than atmospheric pressure, is created therein and in lines 26 and 27 which communicate with the aspirator valve 20. The line 27 communicates with the interior of a brine tank 28 in which the aspirator valve 20 is suitably mounted. The line 27 communicates with an acid dispenser 30 embodying the features of the present invention. By virtue of the partial vacuum or low pressure created in the lines 27 and 26, a brine solution is drawn from the brine tank 28 and a predetermined amount of acid solution is drawn from the acid dispenser 30, respectively. The acid solution and the brine solution enter the aspirator valve 20 and pass through a line 19 to the line 18 and into the tank 16. Suitable valve means (not shown) prevent acid and brine solution from passing directly from the line 18 into the main valve 12. After passing upwardly through the bed of resin particles in the tank 16, and thereby regenerating the resin particles, the acid solution and brine solution are passed to drain through a line 31 after passing through the line 14 and the main valve 12. The main valve 12 prevents the raw water from mixing with the brine solution and acid solution. Likewise, the acid and brine solution cannot enter the service line 22.

When the regeneration of the resin particles in the tank 16 is complete, the regeneration cycle is terminated by actuating the main valve 12 so that the raw water passes through the line 14, the tank 16, the line 18, the main valve 12, and the service line 22, as discussed hereinbefore. During the service cycle some of the treated water passes through the line 19 and the aspirator valve 20 to the line 27 to supply make-up water to the brine tank 28, as is well known in the art. The line 27 has suitable valve means (not shown) to automatically terminate the flow of make-up water to the brine tank 28 after sufficient make-up water has been added. Valve means for this purpose are well known in the art and do not constitute a part of the present invention. The make-up water dissolves solid sodium chloride or the like in the brine tank 28 to form the brine solution utilized in the next regeneration cycle.

Furthermore, treated water under a high pressure (greater than atmospheric pressure) enters the line 26 from the aspirator valve 20. As will be more fully explained hereinafter, the high pressure of the treated water in the line 26 causes the acid dispenser 30 to meter another predetermined amount of acid solution during the service cycle so that the acid dispenser 30 is ready to discharge this acid solution to the line 26 during the regeneration cycle. The partial vacuum or low pressure in the line 26 during the regeneration cycle actuates the acid dispenser 30 whereupon it dispenses the predetermined amount of acid solution which has been metered during the service cycle.

The main valve 12 does not constitute a part of the present invention and suitable valves for this purpose are well known in the art, e.g., the main valve disclosed in United States Patent No. 2,999,514, assigned to the assignee of the present application. Another suitable main valve is disclosed in copending application Serial No. 190,995, filed April 30, 1962, now Patent No. 3,215,273, and assigned to the assignee of the present application. Similarly, suitable aspirator valves 20 are well known in the art. However, it is preferred in this system to employ an aspirator valve of the type disclosed in copending applications Serial No. 170,043, filed January 31, 1962, now abandoned, and Serial No. 191,767, filed May 2, 1962, now Patent No. 3,185,302, which are assigned to the assignee of the present application. The system may, of course, be operated manually, automatically or semi-automatically by suitable means (not shown) which do not constitute a part of the present invention.

Referring to FIGURE 2, the acid dispenser 30 is connected to the line 26 and comprises a container means 32, a liquid cartridge means 34, and a valve means embodying the features of the present invention and indicated generally by reference numeral 36. The container means 32 is adapted to hold the liquid cartridge means 34 which contains the acid solution and provides a determined amount of acid solution to the line 26. The valve means 36, which is actuated by the pressure in the line 26, is connected to the liquid cartridge means 34 and causes the liquid cartridge means to meter a predetermined amount of acid solution and dispense this amount of acid solution to the line 26.

The liquid cartridge means 34 is of the type disclosed in detail in Roland R. Reid's copending application Serial No. 285,822, filed June 5, 1963 and assigned to the assignee of the present application. The cartridge means 34 comprises a plastic bag having a reservoir chamber 38 and a metering chamber 40. The reservoir chamber 38 contains the acid solution. Acid solution is passed from the reservoir chamber 38 to the metering chamber 40 through the valve means 36 during the service cycle, the acid solution in the metering chamber 40 being dispensed through the valve means 36 to the line 26 during the regeneration cycle. The reservoir chamber 38 has an inlet-outlet tube 42 and the metering chamber 40 has an inlet-outlet tube 44. The inlet-outlet tubes 42 and 44 permit acid solution to be placed into and withdrawn from the reservoir chamber 38 and metering chamber 40, respectively, and are small vinyl plastic tubes heat sealed to the plastic bag. The reservoir chamber 38 and the metering chamber 40 are leakproof and no air or liquid may enter except through the tubes 42 and 44, respectively.

The container means 32 is of the type disclosed in detail in application Serial No. 285,822, referred to hereinabove, and includes an elliptically shaped hollow body member 46 having a bottom member 48 attached thereto and a cover 50 which closes the container means 32. Suitable means (not shown) are secured to the body member 46 so that the acid dispenser 30 may be hung in any desired place, such as on the brine tank.

The top of the body member 46 has two downwardly extending, opposite slots 52 therein which are adapted to receive the ends of a rod 54 attached to the cartridge means 34. In this manner, the liquid cartridge means 34 is suspended in the container means 32 from the rod 54. The valve means 34 is mounted in the bottom 48 of the container means 32.

The liquid cartridge means 34 has its reservoir chamber 38 prefilled with acid solution and is sufficiently large to hold sufficient acid solution for several regeneration cycles. The inlet-outlet tube 42 is connected to a flexible tube 64 which communicates with the valve means 36. The tubes 42 and 64 are connected by a plastic coupling member 62 or other suitable means well known in the art. The inlet-outlet tube 44 of the metering chamber 40 is similarly connected to the valve means 36. A flexible plastic tube 68 communicating with the valve 36 is attached by a plastic coupling 66 or the like to the tube 44.

A spring-clip means 70 of the type disclosed in detail in the above-mentioned Reid copending application is attached to the metering chamber portion 40 of the liquid cartridge means 34 so that the volume of the metering chamber 40 may be changed as desired. The spring-clip means 70 allows the volume of the metering chamber 40 to be reduced if a smaller amount of acid solution is to be dispensed to the line 26.

The valve means 36 is adapted to allow acid solution from the reservoir chamber 38 to flow by gravity into the metering chamber 40 during the service cycle and to allow the acid solution which has passed into the metering chamber during the service cycle to flow to the line 26 during the regeneration cycle. To these ends, and as best seen in FIGURES 2–4, the valve means 36 comprises a main body member 80 and an auxiliary body member 82 attached to one another by screws or other suitable means (not shown). The main body member 80 has a first bore or chamber 84 which communicates with a larger second bore or chamber 86 which, in turn, communicates with a still larger third bore or chamber 88. One end of the flexible tubing 64 is connected by a suitable means (not shown) to the main body member 80 and communicates with the first bore 84 through a small passageway 90 in the main body member 80. The flexible tubing 68 is connected to the main body member 80 by suitable means (not shown) and communicates with the second bore 86 through a passageway 92 in the main body member 80.

Mounted within the second bore 86 and the third bore 88 is an annular valve seat means 94 having a central passageway 96. The valve seat means 94 forms a port or valve seat 98 in the second bore 86. A portion of the valve seat means 94 is press-fitted into the second bore 86 or attached to the main valve body member 80 by other suitable means. Suitable sealing means 100, such as a rubber O-ring or the like, is provided about the exterior of the valve seat means 94 to prevent leakage of acid solution between the main body member 80 and the valve seat means 94. The end of the valve seat means 94 in the third bore 88 has a plurality of spaced, outwardly and radially extending ribs 102 which contact a distributor means 104 and form passageways 114 therewith for the flow of acid solution as will be more fully explained hereinafter.

The distributor means 104 is mounted in the third bore 88 by being press-fitted into the main body member 80 or attached thereto by other suitable means. The distributor means 104 has a hub portion 106 and an annular flange portion 108 which are connected by an intermediate web portion 110. The hub portion 106 extends into the valve seat means 94 and forms therewith an outwardly flaring annular passageway 112, having one end communicating with the central passageway 96 and the other end communicating with a plurality of radially extending passageways 114 formed by the ribs 102 of the valve seat means 94 and the web portion 110 and flange portion 108 of the distributor means 104. The passageways 114 communicate with an annular passageway 116 which in turn communicates with the third bore 88. The flow of liquid through the passageway 116 is controlled by an annular-shaped flexible valve closure member 118, made of rubber, plastic or other suitable material, attached to the valve seat means 94. The flexible closure member 118 will permit the flow of liquid through the passageway 116 to the third bore 88, but will not permit the flow of liquid in the reverse direction. The line 26 communicates with the third bore 88 through a passageway 146 and is secured by suitable means to the main valve body member 80.

The annular flange portion 108 of the distributor means 104 has a plurality of grooves about its exterior surface which form with the main valve member 80 a plurality of passageways 120 connecting the third bore 88 with a chamber 122 in the auxiliary body member 82. The auxiliary body member 82 is divided into the chamber 122 and a chamber 124 by a diaphragm means 126 made of rubber or other suitable flexible material. Attached to the diaphragm means 126 is a valve stem 128 having mounted thereon, by threaded engagement or other suitable means, a double valve member 130. One end of the double valve member 130 is adapted to seat on a port or valve seat 132 positioned between the first bore 84 and the second bore 82 and the other end is adapted to seat on the port 98 of the valve seat means 94. To these ends, one end of the valve member 130 has mounted thereon a sealing means 134, such as a rubber O-ring or the like, which will engage the port 132 and prevent the flow of liquid between the first bore 84 and the second bore 86. The other end of the valve member 130 has mounted thereon a sealing means 136, such as a rubber O-ring or the like, which will engage the port 98 and prevent the flow of acid solution from the second bore 86 to the central passageway 96 of the valve seat means 94. The valve stem 128 extends through a central opening in the hub portion 106 of the distributor means 104 and has mounted thereon a sealing means 140, such as a rubber O-ring or the like, to prevent the flow of liquid between the hub portion 106 and the valve stem 128.

In the chamber 124 a guide member 142 is attached to a threaded end of the valve stem 128 extending through the diaphragm means 126. The guide member 142 is biased by a spring means 144 mounted in the auxiliary body member 82. Movement of the diaphragm means 126 controls the movement of the valve stem 128 and thereby controls the opening and closing of the ports 134 and 98. The guide member 142 cooperates with the auxiliary body member 82 to prevent undesirable lateral movement of the valve stem 128.

During the service cycle the line 26 is under high pressure and treated water enters the third bore 88. The valve closure member 118 prevents the treated water from entering the passageways 116 and 114, as shown in FIGURE 2, as the pressure in the third bore 88 is greater than the pressure in the passageway 116. Accordingly, the treated water flows through the passageways 120 into the chamber 122 of the auxiliary body member 82. The flow of treated water is shown in FIGURE 2 by the solid-line arrows. The pressure of the treated water in the chamber 122 is sufficiently great to move the diaphragm means 126, against the force of the spring 144, away from the distributing means 104, causing the valve stem 128 to move until the sealing means 136 of the valve member 130 has seated on and closed the port 98, as shown in FIGURE 2. In this manner, the port 132 is opened whereby acid solution flows by gravity from the reservoir chamber 38 through the tubes 42 and 64, the passageway 90, the first bore 84 and the port 132 into the second bore 86 of the body member 80. The acid solution then passes through the passageway 92 and the tubes 68 and 44 into the metering chamber 40. This flow of acid solution from the reservoir chamber 38 to the metering chamber 40, which is indicated in FIGURE 2 by dotted-line arrows, continues until the metering chamber 40 has been filled with acid solution.

When the service cycle terminates and the regeneration cycle begins, the line 26 is placed under a partial vacuum or low pressure. Accordingly, the pressure in the third bore 88 is reduced and the spring 144 moves the diaphragm means 126 toward the distributing member 104 until the sealing means 134 of the valve member 130 engages and closes the port 132, as shown in FIGURE 4. Acid solution is thereby precluded from flowing into the second bore 86 of the valve means 36. On the other hand, the port 98 is opened and the acid solution in the metering chamber 52 passes through the tubes 44 and 68, the passageway 92, the second bire 86, and the port 98 into the central passageway 96. The acid solution passes from the central passageway 96 into the passageway 112, the passageways 114 and the annular passageway 116. The pressure differential between the third bore 88 and the passageway 116 causes the acid solution to open the flexible valve closure member 118 and pass into the third bore 88 from which it travels to the line 26. The flow of acid solution during the regeneration cycle is indicated by solid-line arrows in FIGURE 4. When the acid solution in the metering chamber 40 has been dispensed to the line 26 in this manner the valve closure member 118 will close. The cycle is repeated when the regeneration cycle terminates.

Referring now to FIGURES 5–7, there is illustrated a modified valve means indicated generally by reference numeral 200 embodying the features of the present invention. As shown in these figures the valve means 200 has been substituted in the acid dispenser 30 for the valve means 36 discussed hereinbefore. Accordingly, the valve means 200 is attached to the tubes 64 and 68 and the pipe 26 to perform the same functions that the valve means 36 performed in the acid dispenser 30. As the valve means 200 is similar in some respects to the valve means 36 described in detail hereinbefore, like reference numerals will be employed where the parts are the same.

The valve 200 comprises a main body 80 and an auxiliary body member 82 attached to one another by screws or other suitable means (not shown). The main body member 80, as discussed hereinbefore, has a first bore or chamber 84 which communicates with a larger second bore or chamber 86 which, in turn, communicates with a still larger third bore or chamber 88. One end of the flexible tubing 64, which is connected to the reservoir chamber 38 in the manner discussed hereinbefore, is connected by suitable means (not shown) to the main body member 80 and communicates with the first bore 84 through a small passageway 90 in the main body member 80. The flexible tubing 68, which communicates with the metering chamber 40 in the manner discussed hereinbefore, is connected to the main body member 80 by suitable means (not shown) and communicates with the second bore 86 through a passageway 92 in the main body 80.

Mounted in the second bore 86 and the third bore 88 is an annular valve seat means 202 having a central passageway 204. The valve seat means 202 forms a port or valve seat 206 in the second bore 86. A portion of the valve seat means 202 is press-fitted into the second bore 86 or attached to the main valve body member 80 by other suitable means. Suitable sealing means 208, such as a rubber O-ring or the like, is provided about the exterior of the valve seat means 202 to prevent leakage of acid solution between the main body member 80 and the valve seat means 202. The end of the valve seat means 202 in the third bore 88 has an outwardly flaring, hollow conical portion 210 with a plurality of circumferentially spaced passageways 212 therein. The passageways 212 permit the third bore 88 and the central passageway 204 to communicate with one another. Flow of liquid between the central passageway 204 and the passageways 212 is controlled by an annular-shaped floatable valve closure member 214, made of plastic or other suitable material, which is slidably attached to a valve stem 218 for reasons more apparent hereinafter. The rigid valve closure member 214 will permit the flow of liquid from the central passageway 204 through the passageways 212 to the third bore 88, but will not permit the passage of liquid in the reverse direction. The line 26 communicates with the third bore 88 through a passageway 146 and is secured by suitable means to the main valve body member 80.

A diaphragm means 126 is positioned in the auxiliary body member 82 and is made of rubber or other suitable material. Attached to the diaphragm means 126 is the valve stem 218 having mounted thereon, by threaded engagement or other suitable means, a double valve member 130. One end of the double valve member 130 is adapted to seat on a port or valve seat 132 positioned between the first bore 84 and the second bore 86 and the other end is adapted to seat on the port 206 of the valve seat means 202. To these ends, one end of the valve member 130 has mounted thereon a sealing means 134, such as a rubber O-ring or the like, which will engage the port 132 and prevent the flow of liquid between the first bore 84 and the second bore 86. The other end of the valve member 130 has mounted thereon a sealing means 136, such as a rubber O-ring or the like, which will engage the port 206 and prevent the flow of acid solution from the second bore 86 to the central passageway 204 of the valve seat means 202. The stem 218 extends through the central passageway 204 of the valve seat means 202.

In a chamber 220 of the auxiliary body mmeber 82 a guide member 142 is attached to a threaded end of the valve stem 218 extending through the diaphragm means 126. The guide member 142 is biased by a spring means 144 mounted in the auxiliary body member 82. Movement of the diaphragm means 126 controls the movement of the valve stem 218 and thereby controls the opening and closing of the ports 132 and 206. The guide member 142 cooperates with the auxiliary body member 82 to prevent undesirable lateral movement of the valve stem 218.

During the service cycle the line 26 is under high pressure and treated water enters the third bore 88. The treated water enters the interior of the valve seat means 202 by passing through the passageways 212 in the conical portion 210 of the valve seat means 202. The closure 214 has a slip-fit about the valve stem 218 and may move upwardly or downwardly on the valve stem 218. When the treated water enters the interior of the valve seat means 202, the valve closure member 214 will float on the treated water and move away from the diaphragm means 126 until it contacts the conical flange portion 210 of the valve seat means 202, as shown in FIGURE 5. When this occurs treated water is prevented from entering the central passageway 204. The flow of treated water is shown in FIGURE 5 by solid-line arrows. The pressure of the treated water will cause the diaphragm means 126 to move away from the valve seat means 202 against the force of the spring 144. This causes the valve stem 218 to move until the sealing means 136 of the valve member 130 has seated on and closed the port 206. In this manner, the port 132 is opened whereby acid solution flows by gravity from the reservoir chamber 38 through the tubes 42 and 64, the passageway 90, the first bore 84 and the port 132 into the second bore 86 of the body member 80. The acid solution then passes through the passageway 92 and the tubes 68 and 44 into the metering chamber 40. This flow of acid solution from the reservoir chamber 38 to the metering chamber 40, which is indictaed in FIGURE 5 by dotted-line arrows, continues until the metering chamber 40 has been filled with acid solution.

When the service cycle terminates and the regeneration cycle begins, the line 26 is placed under a partial vacuum or low pressure. Accordingly, the pressure in the third bore 88 is reduced and the spring 144 moves the diaphragm means 126 towards the valve seat means 202 until the sealing means 134 of the valve member 130 engages and closes the port 132, as shown in FIGURE 7. Acid solution is thereby precluded from flowing into the second bore 86 of the valve means 200. On the other hand, the port 206 is opened and the acid solution in the metering chamber passes through the tubes 44 and 68, the passageway 92, the second bore 86 and the port 98 into the central pasageway 204. The pressure differential between the central passageway 204 and the third bore 88 causes the valve closure member 214 to move toward the diaphragm means 126 and away from the valve seat means 202. Accordingly, the acid solution passes from the central passageway 204 through the passageways 212 into the third bore 88. The acid solution passes to the line 26 through the passageway 216. The flow of acid solution during the regeneration cycle is indicated by solid-line arrows in FIGURE 7. When the acid solution in the metering chamber 40 has been dispensed to the line 26 in this manner, the valve means 200 is ready for the next cycle, which is repeated when regeneration terminates.

The various components of the valves 36 and 200, with the exception of the diaphragm means 126 and the valve closure means 118 and 214, may be made of steel or other suitable metal, as well as plastic material, as is well known in the art. Furthermore, though the valve means 36 and 200 have been discussed in detail in relation to their use in an acid dispenser, it will be readily apparent that these valves have a myriad of applications where a pressure-actuated valve is required to allow fluid to pass from a first line to a second line and then from the second line to a third line.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. A valve means comprising a body member having a first and second chamber therein, said first chamber communicating with a first line through a first port, said second chamber communicating with a third line adapted to be connected to means having a low pressure and a high pressure cycle, a valve seat means mounted in said body member, said valve seat means having a central passageway therethrough, said central passageway providing communication between said first and second chamber, one end of said passageway forming a second port, a second line communicating with said first chamber, a valve member adapted to open and close said first and second ports, said valve member being connected to a diaphragm means which moves in response to the pressure in said second chamber, and means to prevent communication between said first and second chambers when said third line is in its high pressure cycle comprising a flexible annular member associated with an annular passageway through which said second chamber communicates with said central passageway, said flexible member closing said annular passageway when said third line is in its high pressure cycle and opening said annular passageway when said third line is in its low pressure cycle, whereby said valve member closes said second port and opens said first port and to allow communication between said first and second chambers when said third line is in its low pressure cycle whereby said valve member closes said first port and opens said second valve port.

2. A valve means comprising a body member having a first and second chamber therein, said first chamber communicating with a first line through a first port, said second chamber communicating with a third line adapted to be connected to means having a low pressure and a high pressure cycle, a valve seat means mounted in said body member, said valve seat means having a central passageway therethrough, said central passageway providing communication between said first and second chamber, one end of said passageway forming a second port, a second line communicating with said first chamber, a valve member adapted to open and close said first and second ports, said valve member being connected to a diaphragm means which moves in response to the pressure in said second chamber, a distributor means mounted in said second chamber between said valve seat means and said diaphragm means, said distributor means forming with said valve seat means a first passageway connecting said second chamber and said central passageway, a member made of flexible material extending over said first passageway, said flexible member closing said first passageway when said third line is in its high pressure cycle and opening said first passageway when said third line is in its low pressure cycle, said valve member closing said second port and opening said first port during said high pressure cycle and opening said second port and closing said first port during said low pressure cycle.

3. The valve means of claim 2 wherein said distributor means forms a second passageway with said body member whereby fluid entering said second chamber during said high pressure cycle actuates said diaphragm means to move away from said distributor means and thereby move said valve member to close said second port and open said first port.

4. The valve means of claim 3 wherein said first passageway is annular shaped and said flexible member is annular shaped and positioned over an end of said annular first passageway communicating with said second chamber, and said valve member and said diaphragm means being spring biased whereby said valve member closes said first port and opens said second port.

5. A valve means comprising a body member having a first and second chamber therein, said first chamber communicating with a first line through a first port, said second chamber communicating with a third line adapted to be connected to means having a low pressure and a high pressure cycle, a valve seat means mounted in said body member, said valve seat means having a central passageway therethrough, said central passageway providing communication between said first and second chamber, one end of said passageway forming a second port, a second line communicating with said first chamber, a valve member adapted to open and close said first and second ports, said valve member being connected to a diaphragm means which moves in response to the pressure in said second chamber, a floatable member in said body member which will close said central passageway when liquid enters said second chamber during said high pressure cycle of said third line, said valve member closing said second port and opening said first port during said high pressure cycle and closing said first port and opening said second port during said low pressure cycle.

6. The valve means of claim 5 wherein said valve seat means has an annular, outwardly flaring flange having an exterior edge engaging said body member, said floatable member engaging said flange to close said central passageway.

7. The valve means of claim 6 wherein said valve member includes a valve stem attached to said diaphragm means, said floatable member being annular shaped and slidably attached to said valve stem, said floatable member moving on said valve stem to open and close said central passageway.

8. In a water softening system wherein water to be treated is contacted with ion exchange resin particles during a service cycle and the ion exchange resin particles are regenerated with an acid solution and a brine solution during a regeneration cycle, including an acid dispenser connected to a line in said system for passing acid solution to said resin particles during said regeneration cycle, means for providing a low pressure in said line during said regeneration cycle and a high pressure in said line during said service cycle, said acid dispenser having a reservoir chamber for said acid solution and a metering chamber, a valve means for passing acid solution from said reservoir chamber to said metering chamber and from said metering chamber to said line, said valve means comprising a body member forming a first and second chamber, said first chamber communicating with said reservoir chamber and said metering chamber, said second chamber communicating with said line, and pressure responsive means mounted in said body member to permit acid solution to pass from said reservoir chamber to said metering chamber during said service cycle and to permit acid solution to pass from said metering chamber to said line during said regeneration cycle, said pressure responsive means preventing acid solution from said reservoir chamber from passing to said line during said service cycle and preventing acid solution from said reservoir chamber from passing into said first chamber during said regeneration cycle.

9. The invention defined in claim 8 wherein:
said pressure responsive means comprises diaphragm means having one side thereof communicating with said second chamber, spring means, and means including said diaphragm means being moved against the force of said spring means by high presesure in said second chamber so as to cause communication between said reservoir chamber and said metering chamber during said service cycle, and said means including said diaphragm means being moved by said spring means during said regeneration cycle so as to prevent communication between said reservoir chamber and said metering chamber.

10. The invention defined in claim 8 wherein:
said pressure responsive means comprises check valve means actuated by high pressure in said second chamber to prevent flow from said second chamber to said first chamber during said service cycle but permitting flow from said first chamber to said second chamber during said regeneration cycle.

References Cited by the Examiner

UNITED STATES PATENTS

| | | | |
|---|---|---|---|
| 2,304,661 | 12/1942 | Shoemaker | 210—191 X |
| 2,565,045 | 8/1951 | Ray | 222—444 X |
| 2,838,208 | 6/1958 | Levit | 222—453 X |
| 3,073,674 | 1/1963 | Rudelick | 210—191 X |
| 3,084,707 | 4/1963 | Frye | 137—102 |
| 3,196,890 | 7/1965 | Brandenberg | 137—102 |
| 3,216,931 | 11/1965 | Dennis et al. | 210—190 X |
| 3,220,552 | 11/1965 | Staats | 210—191 X |

FOREIGN PATENTS 990,320   6/1951   France.

REUBEN FRIEDMAN, *Primary Examiner.*

C. M. DITLOW, *Assistant Examiner.*